US012631125B1

(12) United States Patent
Alecu et al.

(10) Patent No.: US 12,631,125 B1
(45) Date of Patent: May 19, 2026

(54) COMPRESSOR COOLING SYSTEM FOR A TURBOFAN ENGINE

(71) Applicant: PRATT & WHITNEY CANADA CORP., Longueuil (CA)

(72) Inventors: Daniel Alecu, Brampton (CA); David Menheere, Norval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/185,887

(22) Filed: Apr. 22, 2025

(51) Int. Cl.
*F01D 25/12* (2006.01)
*F04D 17/10* (2006.01)
*F04D 29/42* (2006.01)

(52) U.S. Cl.
CPC ............. *F01D 25/12* (2013.01); *F04D 17/10* (2013.01); *F04D 29/4206* (2013.01); *F05D 2260/201* (2013.01); *F05D 2260/232* (2013.01)

(58) Field of Classification Search
CPC .... F02C 7/057; F02C 9/52; F02K 1/28; F15D 1/14; F05D 2260/601; F05D 2260/606
See application file for complete search history.

(56) References Cited

U.S. PATENT DOCUMENTS 3,524,458 A * 8/1970 Laurence ................ F02C 7/042 415/181
3,624,751 A * 11/1971 Dettling .................... F15D 1/00 137/806
7,556,223 B2 * 7/2009 Acheson ............... B64C 1/1453 244/129.1
9,045,998 B2 * 6/2015 Lo ............................. F02C 6/08
9,108,737 B2 * 8/2015 Zysman ................. B64D 29/00
10,087,772 B2 10/2018 Sun et al.
10,822,991 B2 11/2020 Clarke et al.
11,815,106 B1 11/2023 Ress, Jr.
2008/0118348 A1 * 5/2008 Alecu ....................... F02K 1/30 60/226.3
2011/0171006 A1 * 7/2011 Peters ....................... F02C 6/08 137/15.1
2020/0182081 A1 * 6/2020 Sidorovich Paradiso .................. F01D 17/14

FOREIGN PATENT DOCUMENTS

CA 3032170 A1 * 8/2019 ............. F01D 11/24

OTHER PUBLICATIONS

"Substantially" definition, Merriam-Webster, retreived 2025 <https://www.merriam-webster.com/dictionary/substantially> (Year: 2025).*

* cited by examiner

*Primary Examiner* — Courtney D Heinle
*Assistant Examiner* — Ryan C Clark
(74) *Attorney, Agent, or Firm* — NORTON ROSE FULBRIGHT CANADA LLP

(57) ABSTRACT

A cooling system for a compressor casing of an turbofan engine includes a cooling conduit extending between an inlet in fluid communication with a bypass duct of the turbofan engine and an outlet in fluid communication with an outer surface of the compressor casing. A shroud of the compressor is mounted to the compressor casing. A protrusion is disposed about an opening to the inlet and protrudes radially outwardly into the bypass duct A valve in selective fluid communication with the inlet of the cooling conduit is operable to selectively inject a flow of high pressure air from a high pressure air source towards the inlet of the cooling conduit to modulate a flow of bypass air entering the cooling conduit.

20 Claims, 8 Drawing Sheets

COMPRESSOR COOLING SYSTEM FOR A TURBOFAN ENGINE

TECHNICAL FIELD

The present disclosure relates generally to aircraft engines and, more particularly, to compressor cooling systems for turbofan engines.

BACKGROUND

Certain aircraft engines are provided with cooling systems that cool compressor sections and that vary a clearance gap between a compressor rotor of the compressor and a surrounding shroud, in order to optimize the clearance therebetween. While existing systems are suitable for their intended purposes, improvements are desired.

SUMMARY

In one aspect, there is provided a turbofan engine for an aircraft, comprising: a compressor section including a compressor casing and a centrifugal compressor, an annular main gas path extending axially through a core casing of the turbofan engine within the compressor section, the centrifugal compressor including an impeller that rotates within a shroud surrounding blades of the impeller, the shroud being secured to the compressor casing, a tip clearance defined between blades of the impeller and the shroud; a bypass duct disposed radially outward of the core casing and defining a bypass gas path extending therethrough; a cooling conduit extending between an inlet in the bypass duct and an outlet adjacent to the compressor casing, a protrusion disposed about an opening to the inlet and protruding radially outwardly into the bypass duct, the cooling conduit including a manifold and a perforated screen adjacent the outlet; and a valve in selective fluid communication with the inlet of the cooling conduit, the valve fluidly coupled to a source of high pressure air and being controlled to move between a closed position and an open position, wherein in the open position during operation of the turbofan engine a flow of the high pressure air is injected adjacent the inlet of the cooling conduit in a direction substantially tangential to the bypass gas path, and in the closed position during operation of the turbofan engine the high pressure air is substantially prevented from being injected into the cooling conduit or the bypass duct.

The turbofan engine as defined above and described herein also includes, in certain embodiments, one or more of the following features, in whole or in part, and in any combination.

In certain aspects, the protrusion includes a first radial height relative to the core casing at an upstream end of the opening to the inlet and a second radial height relative to the core casing at a downstream end of the opening to the inlet, the first radial height and the second radial height being different.

In certain aspects, the first radial height is greater than the second radial height, and the valve is positioned in the open position to inject the high pressure air under an acceleration condition of the turbofan engine, thereby increasing a flow rate of cooling air through the cooling conduit.

In certain aspects, the second radial height is greater than the first radial height.

In certain aspects, the valve is positioned in the closed position under an acceleration condition of the turbofan engine, thereby increasing a flow rate of cooling air through the cooling conduit.

In certain aspects, the perforated screen at the outlet of the cooling conduit extends circumferentially about an entire circumference of the compressor casing.

In certain aspects, a plurality of the cooling conduit with a plurality of the perforated screen circumferentially spaced apart about a circumference of the compressor casing.

In certain aspects, the perforated screen includes a double-walled metal sheet having perforations disposed therethrough.

There is also provided a cooling system for a compressor casing of an turbofan engine comprising a compressor, the cooling system comprising: a cooling conduit extending between an inlet in fluid communication with a bypass duct of the turbofan engine and an outlet in fluid communication with an outer surface of the compressor casing, a shroud of the compressor being mounted to the compressor casing, a protrusion disposed about an opening to the inlet and protruding radially outwardly into the bypass duct; and a valve in selective fluid communication with the inlet of the cooling conduit, the valve selectively injecting a flow of high pressure air from a high pressure air source towards the inlet of the cooling conduit to modulate a flow of bypass air entering the cooling conduit.

The cooling system as defined above and described herein also includes, in certain embodiments, one or more of the following features, in whole or in part, and in any combination.

In certain aspects, the protrusion includes a first radial height into the bypass duct at an upstream end of the opening to the inlet and a second radial height into the bypass duct at a downstream end of the opening to the inlet, the first radial height being greater than the second radial height.

In certain aspects, the valve is adapted to increase a flow rate of the flow of high pressure air injected into the bypass duct under an acceleration condition of the turbofan engine.

In certain aspects, the protrusion includes a first radial height into the bypass duct at an upstream end of the opening to the inlet and a second radial height into the bypass duct at a downstream end of the opening to the inlet, the second radial height being greater than the first radial height.

In certain aspects, the valve is adapted to decrease a flow rate of the flow of high pressure air injected into the bypass duct under an acceleration condition of the turbofan engine.

In certain aspects, a perforated screen at the outlet of the cooling conduit, wherein the perforated screen extends circumferentially about an entire circumference of the compressor casing.

In certain aspects, the cooling conduit is one of a plurality of cooling conduits, the plurality of cooling conduits including perforated screens at the outlet thereof, the perforated screens being circumferentially spaced apart about a circumference of the compressor casing.

In certain aspects, the perforated screen includes a double-walled metal sheet having perforations disposed therethrough.

There is further provided a method for operating a cooling system for a compressor casing in a turbofan aircraft engine, comprising: flowing bypass air through a bypass duct in the turbofan aircraft engine adjacent to an inlet of a cooling conduit fluidly coupling the bypass duct to a compressor casing of the turbofan aircraft engine; upon receipt of an indication of a change in an operating condition of the turbofan aircraft engine, activating a valve adjacent to the inlet of the cooling conduit to modulate a flow of high pressure air flowing adjacent to the inlet of the cooling conduit, the flow of high pressure air governing a flow of a portion of the bypass air into the cooling conduit via the inlet of the cooling conduit; subsequent to the activating the valve adjacent to the inlet of the cooling conduit, flowing the portion of the bypass air to a manifold at an outlet of the cooling conduit; and impinging the portion of the bypass air in the manifold against an outer surface of the compressor casing.

The method as defined above and described herein also includes, in certain embodiments, one or more of the following features, in whole or in part, and in any combination.

In certain aspects, the change in the operating condition of the turbofan aircraft engine includes the turbofan aircraft engine being in an acceleration condition, and wherein the activating the valve adjacent to the inlet of the cooling conduit includes increasing a flow rate of the high pressure air flowing adjacent the inlet to the cooling conduit.

In certain aspects, the change in the operating condition of the turbofan aircraft engine includes the turbofan aircraft engine being in an acceleration condition, and wherein the activating the valve adjacent the inlet to the cooling conduit includes decreasing a flow rate of the high pressure air flowing adjacent the inlet to the cooling conduit.

In certain aspects, the impinging the portion of the bypass air in the cooling conduit against the outer surface of the compressor casing includes impinging the portion of the flow of the bypass air in the cooling conduit against the outer surface of the compressor casing about an entire outer circumference of the compressor casing.

BRIEF DESCRIPTION OF THE DRAWINGS

Reference is now made to the accompanying figures in which.

DETAILED DESCRIPTION

Figure 1:
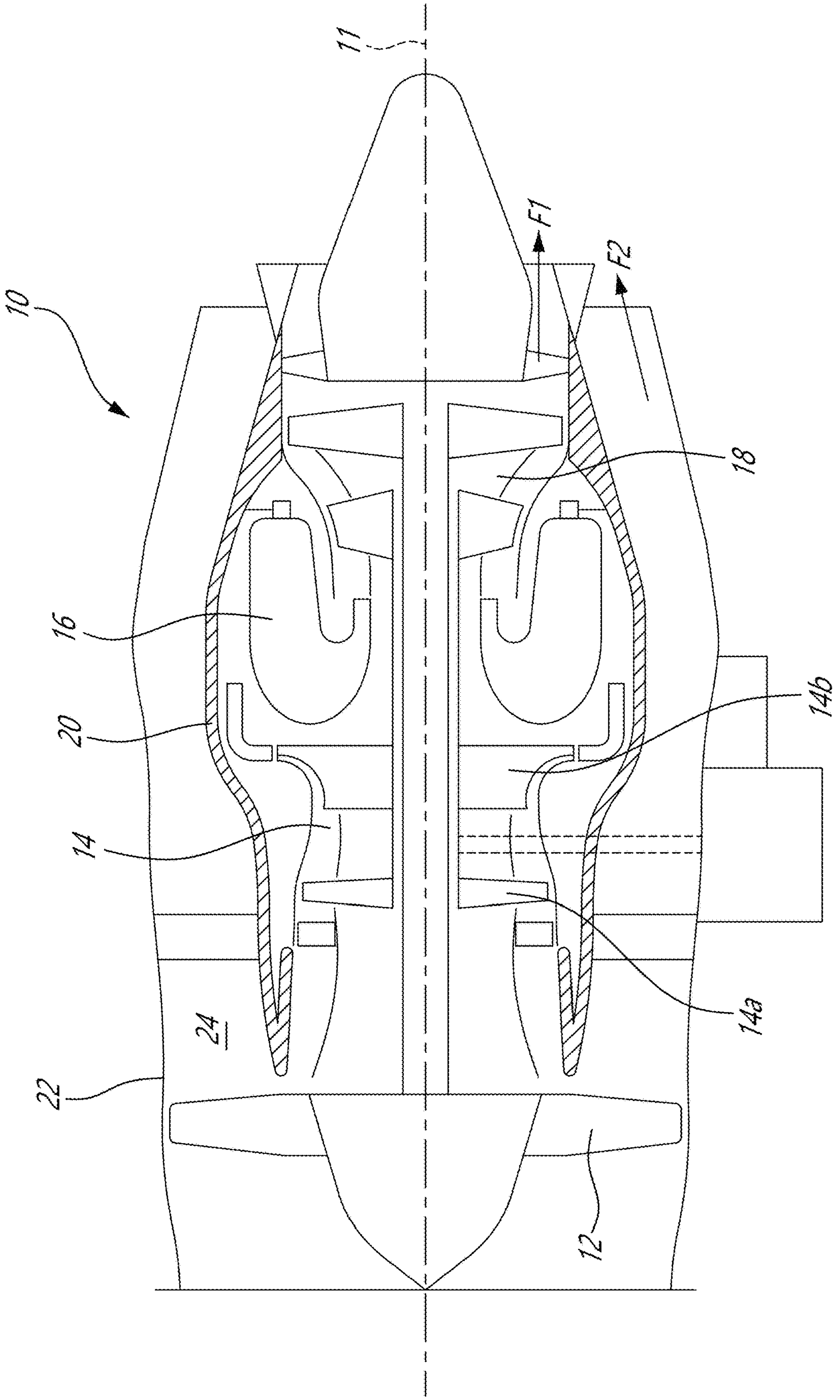
FIG. 1 is a schematic cross-sectional view of a gas turbine engine.

FIG. 1 illustrates a gas turbine engine 10 of a type preferably provided for use in subsonic flight, illustratively a turbofan type engine, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases, with the compressor section 14, combustor 16, and turbine section 18 defining an annular gas path extending around a central axis 11. A core casing 20 surrounds the compressor section 14, combustor 16, and turbine section 18. A housing or nacelle 22 surrounds the core casing 20 and defines an annular bypass passage 24, also referred to as a bypass duct, therebetween. It is thus said that a main gas flow F1 flows through the core casing 20, defining a main gas path through the core of the engine 10, while a flow of bypass air F2 flows through the bypass passage 24, defining a bypass gas path.

Figure 2:
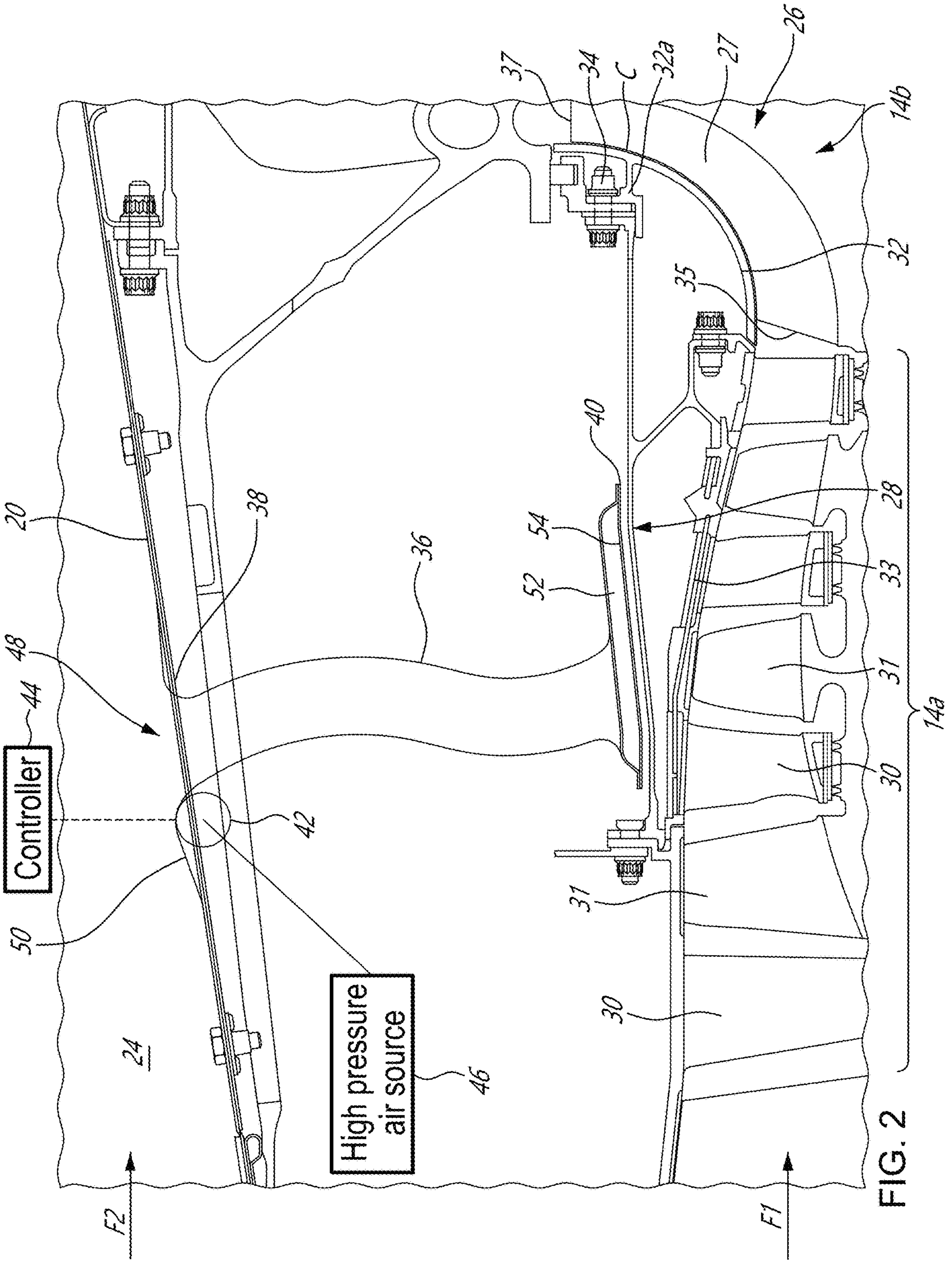
FIG. 2 is a schematic cross-sectional view of a compressor section of the engine of FIG. 1.

Referring to both FIG. 1 and FIG. 2, the compressor section 14 of the engine 10 includes a low pressure compressor 14*a* downstream of the fan 12 and a high pressure compressor 14*b* downstream of the low pressure compressor 14*a* and upstream of the combustor 16. In other cases, the engine 10 can include other numbers of compressors in the compressor section 14. In the embodiment depicted in FIG. 2, the low pressure compressor 14*a* is an axial compressor and the high pressure compressor 14*b* is a centrifugal compressor. The axial compressor may therefore also be identified herein by reference number 14*a*, and the centrifugal compressor may be identified herein by reference number 14*b*. The axial compressor 14*a* as depicted in FIG. 2 includes a plurality of stages, each stage including a rotating axial compressor rotor 31 and a row of vanes 30 downstream of each compressor rotor 31. The vanes 30 are mounted to a low pressure compressor casing 33, which radially surrounds the rotating axial compressor rotors 31 and is disposed immediately upstream of a compressor shroud 32 of the centrifugal compressor forming the high pressure compressor 14*b*. The low pressure compressor casing 33 and the compressor shroud 32 thereby form an outer boundary of the main gas path through the engine core within the compressor section 14. The low pressure compressor 14*a* can include a few as one stage (i.e., one compressor rotor 31 and associated row of vanes 30) or a plurality of stages. The high pressure compressor 14*b* of the present disclosure is a centrifugal compressor including an impeller 26 that rotates within the compressor shroud 32 that is shaped to complement and surround the impeller 26.

The compressor section 14 includes a compressor casing 28, also referred to herein as a housing, that surrounds at least a portion of the axial compressor 14*a* and/or the centrifugal compressor 14*b*. The low pressure compressor casing 33 and the compressor shroud 32 of the centrifugal compressor 14*b* are supported by and fastened to the compressor casing 28. In the depicted embodiment, the compressor shroud 32 of the centrifugal compressor 14*b* is secured to and located radially inwardly of the casing 28. During operation of the engine 10, the impeller 26 rotates within the compressor shroud 32, with a tip clearance C (or simply "clearance" C) defined between the blades 27 of the impeller 26 and an inner surface (facing the gaspath) of the compressor shroud 32. This clearance gap C may also be referred to as a tip clearance gap of the impeller 26. Because the impeller 26 receives air axially at its inlet and expels compressed air in a radial direction at its outlet, it will be appreciated that the clearance C between the outer tips of the blades 27 of the impeller 26 and the surrounding compressor shroud 32 may be substantially radial in direction (i.e., a radial clearance) near a leading edge 35 of the impeller blades 27 and may be substantially axial in direction (i.e., an axial clearance) near a trailing edge 37 of the impeller blades 27. The aforementioned radial and axial directions being relative to the central axis 11 (see FIG. 1).

Maintaining an appropriate tip clearance C between the blades 27 of the impeller 26 and the surrounding compressor shroud 32 can help limit performance losses, for instance by avoiding contact or rubbing between the impeller 26 and an inner surface of the shroud 32, and by limiting air leakage between the impeller blades and the shroud. As shown in FIG. 2, the compressor casing 28 is coupled to the compressor shroud 32 of the centrifugal compressor 14*b* via fastener 34 joining the casing 28 to a flange 32*a* extending from the compressor shroud 32. Other coupling arrangements are contemplated. As the operating condition of the engine 10 changes, for instance during an acceleration condition or phase, the temperatures of the various core components can change (i.e., increase) as well. During such changes in conditions, the casing 28 will increase in temperature at a quicker rate than the impeller 26 due to its lower thermal inertia. The increase of temperature of the casing 28 causes the casing 28 to expand and displace in an axial direction relative to axis 11, causing the shroud 32 to axially displace as well. As the impeller 26 will not expand at the same rate as the casing 28, the axial displacement of the casing 28 and shroud 32 will cause the clearance C between the inner surface of the shroud 32 and the impeller 26 to decrease. The decrease in the clearance C, also referred to as a pinch point, can cause performance and/or life expectancy of the components to be reduced. It is thus desirable to maintain an appropriate clearance C, for instance by cooling the compressor casing 28 under certain operating conditions, such as to limit rapid growth of the casing 28 relative to the adjacent components.

Still referring to FIG. 2, there is provided a cooling system for the compressor casing 28 according to an embodiment of the present disclosure. The cooling system includes a cooling conduit 36, also referred to as a cooling duct, extending between an inlet 38 in fluid communication with the bypass passage 24 and an outlet 40 in fluid communication with the casing 28. As discussed in further detail below, the cooling system is configured for selectively flowing a portion of the bypass air F2 through the cooling conduit 36 towards an outer surface of the casing 28 to cool the casing 28. In the shown embodiment, the level of cooling provided to the casing 28 is modulated based on an operating condition of the engine 10. For instance, under an acceleration condition of the engine 10 in which the casing 28 is prone to thermally expand, the volumetric flow rate of cooling air through the cooling conduit 36 is increased. An air distribution device 42, which is also referred to herein as a valve 42, is controlled such as to selectively inject, when desired, a flow of high pressure air into the cooling conduit 36, adjacent to or at the inlet 38 thereof, to control or modulate the volumetric flow rate of cooling air through the cooling conduit 36 towards the casing 28. The valve 42, which is fluidly coupled to the source 46 of high pressure air, is thus controlled (e.g., by a controller 44) such to move between a closed position and an open position. In the open position of the valve 42, a flow of the high pressure air is injected into the cooling conduit 36 adjacent the inlet 38 thereof in a direction substantially tangential to the bypass gas path. In the closed position, substantially no high pressure air is injected into the cooling conduit or the bypass duct. The term “substantially” as used herein in the context of the closed position of the valve implies that all or almost all of the high pressure air is prevented from being injected into the cooling conduit or the bypass conduit, however it remains possible that minor leakage flow could still occur even in this closed position. In most situations, the valve 42 is operated and controlled such as to be either fully open or fully closed, as required. However, in certain embodiments, it is also possible to position the valve in one or more positions located between the fully open and fully closed positions, to thereby modulate the flow of the high pressure air being injected. In the shown case, the controller 44 is provided for activating the valve 42 to selectively flow high pressure air or compressed air from a high pressure air source 46 within the engine 10, for instance a bleed location in the engine 10. Other air distribution devices and control arrangements therefor are contemplated.

Still referring to FIG. 2, the inlet 38 of the cooling conduit includes an opening 48 through the core casing 20 to the bypass passage 24. A protrusion 50, which forms at least part of an air scoop, extends about and adjacent to the opening 48 and protrudes radially outwardly into the bypass passage 24. Various configurations and geometries for the protrusion 50 are contemplated. As discussed in further detail below, the protrusion 50 is configured, along with the selective injection of high pressure air by the valve 42, to control the flow rate of the cooling air flowing through the cooling conduit 36 towards the compressor casing 28. In particular, the specific geometry of the protrusion 50, as well as the selective injection of high pressure air by the valve, is configured for disrupting the flow of bypass air F2 adjacent to the inlet 38 to control the flow of cooling air that enters the cooling conduit 36.

Still referring to FIG. 2, the outlet 40 includes an air distribution device which illustratively includes a manifold 52 receiving the cooling air flowing through the cooling conduit 36 and a perforated screen 54 for impinging the cooling air in the manifold 52 against an outer surface of the compressor casing 28. In some cases, the air distribution device (i.e., the manifold 52 and perforated screen 54), also referred to as a “shower head” distribution device, extends circumferentially about an entire outer circumference of the compressor casing 28. In other cases, the air distribution device circumferentially extends about only a portion of the circumference of the compressor casing 28. In other cases, a plurality of cooling conduits 36 and air distribution devices are provided and circumferentially and/or axially spaced apart about a portion or all of the circumference of the compressor casing 28. Other configurations are contemplated as well. In the shown case, the perforated screen 54 is formed of a double-walled metal sheet having perforations disposed therethrough. Other configurations for the perforated screen 54 are contemplated.

Figure 3A:
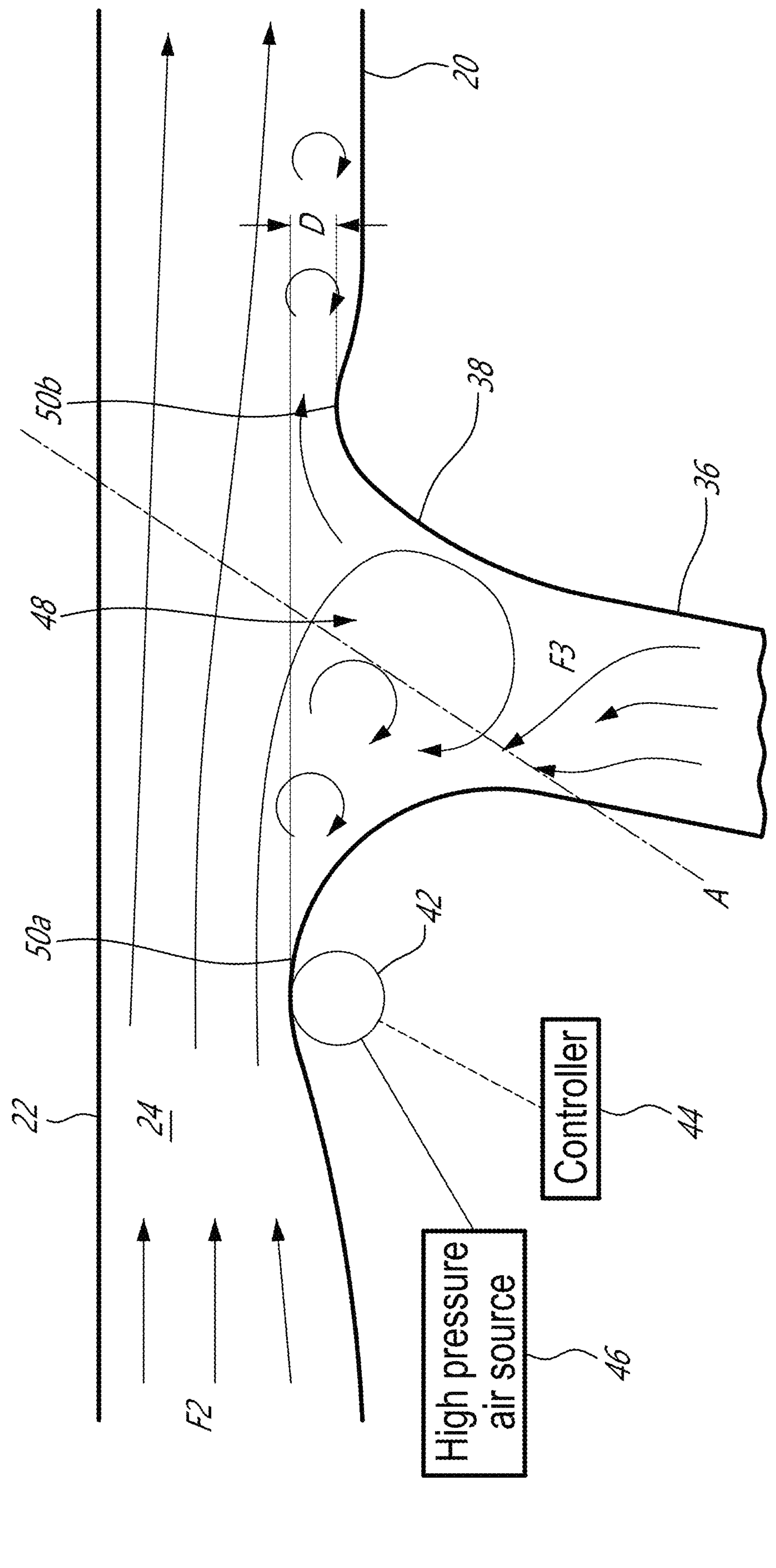
FIGS. 3A-3B are schematic cross-sectional views of an inlet to a compressor casing cooling conduit of the gas turbine engine of FIG. 1.
Figure 3B:
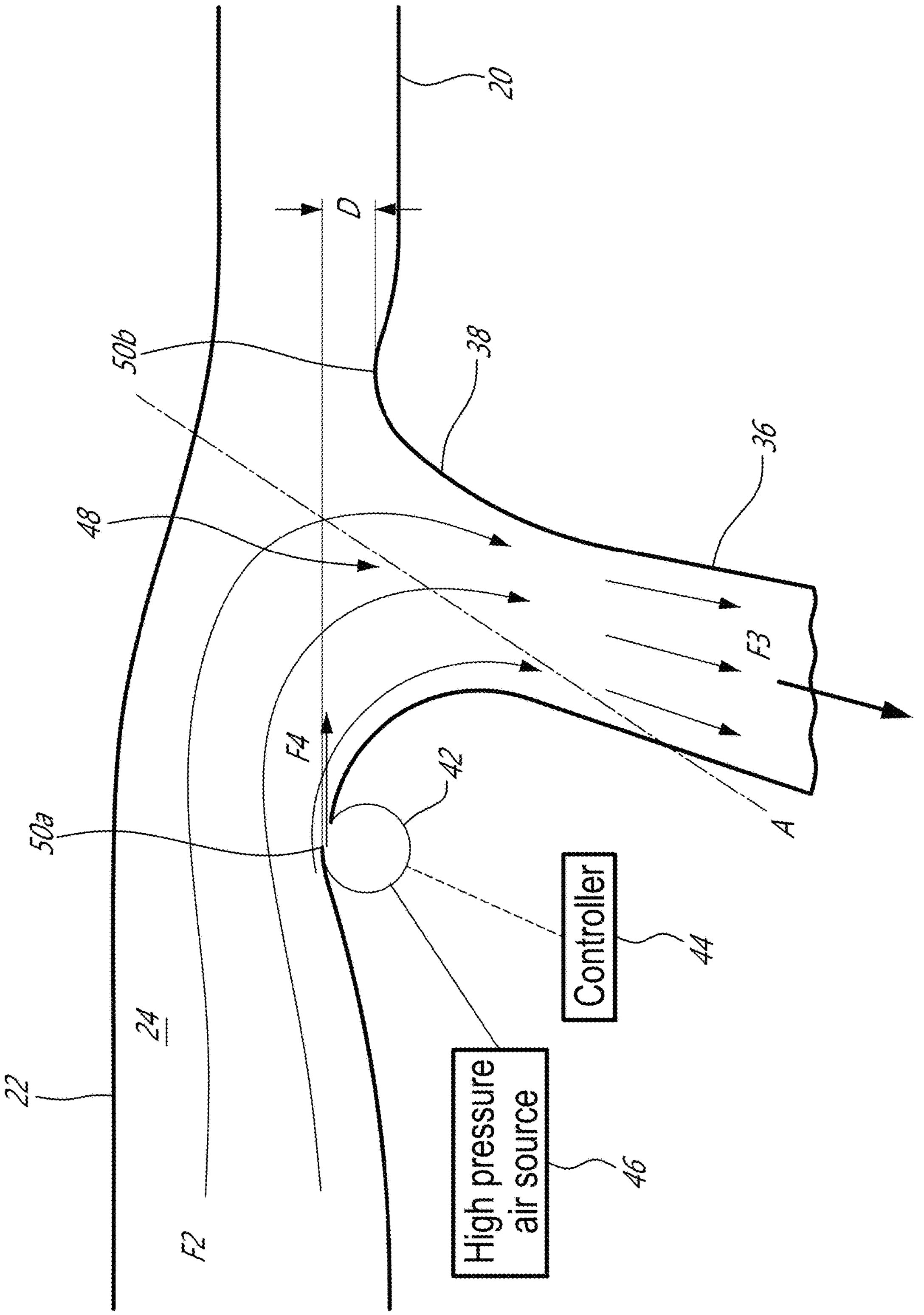
Figure 4A:
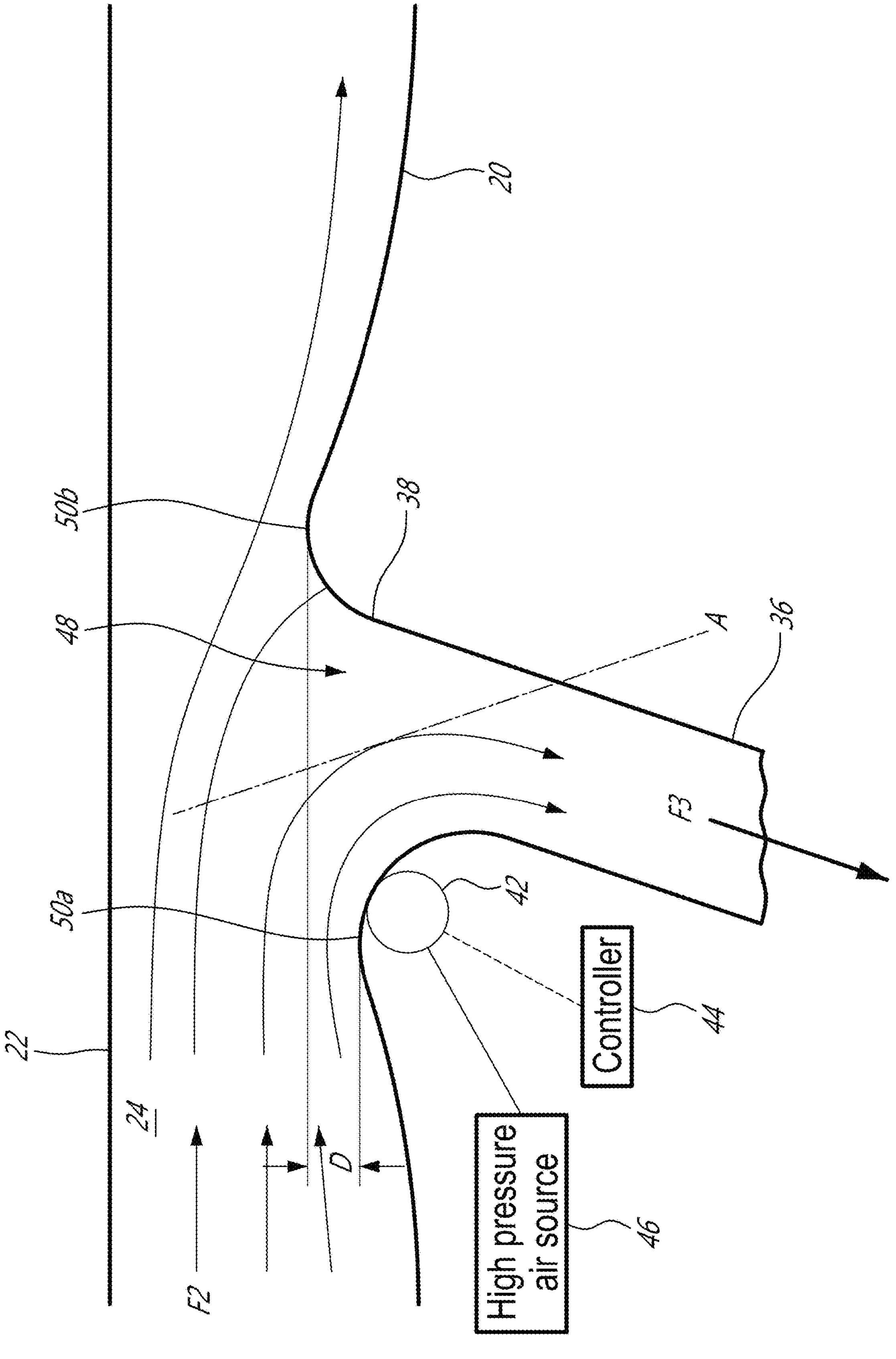
FIGS. 4A-4B are schematic cross-sectional views of an inlet to a compressor casing cooling conduit of the gas turbine engine of FIG. 1.
Figure 4B:
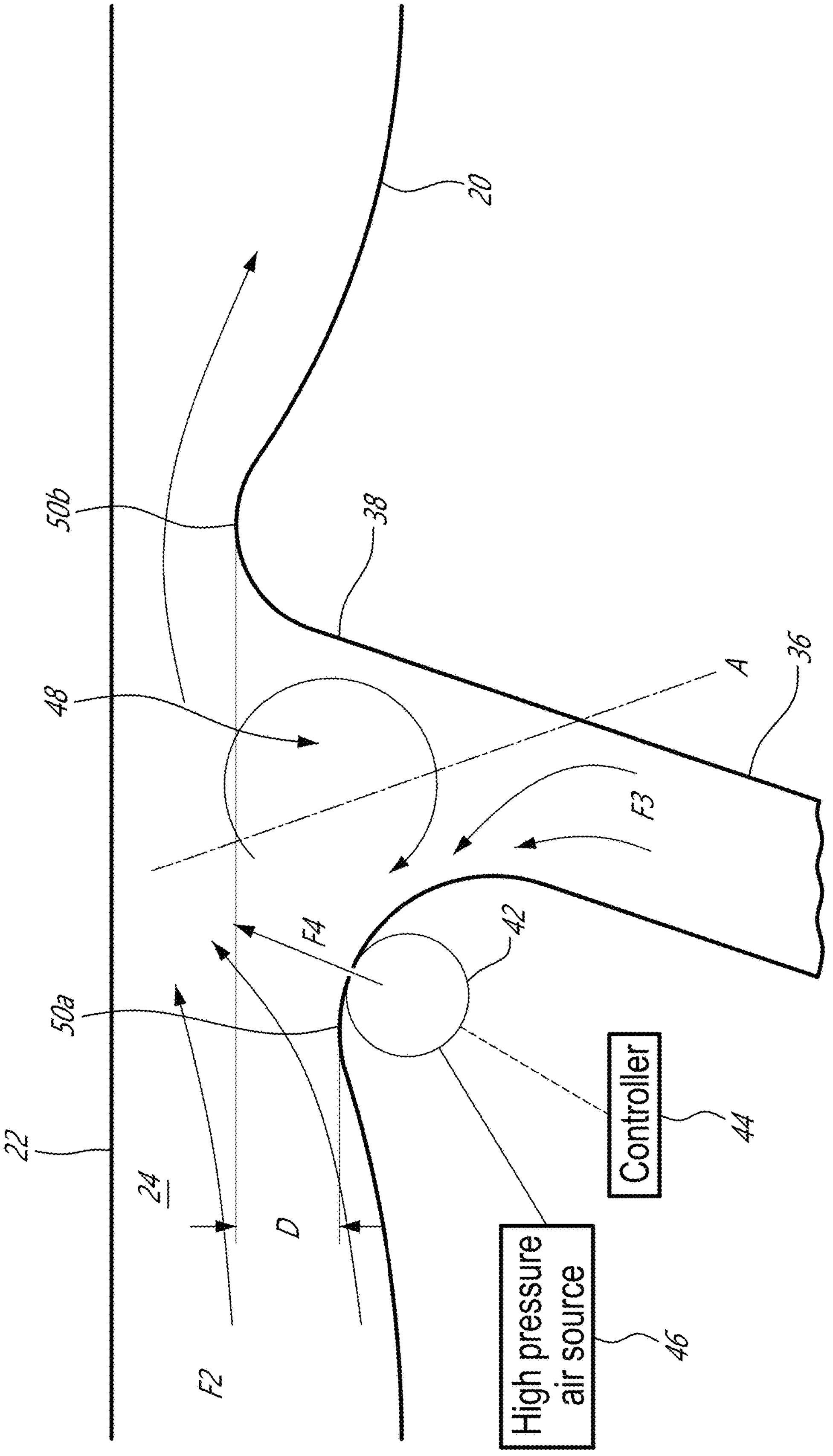

Referring now to FIGS. 3A-4B, embodiments of the inlet 38 are shown. As discussed above, the bypass passage 24 through which the bypass air F2 flows is radially bound by the core casing 20 at its radially inner limit and the nacelle 22 at its radially outer limit. The inlet 38 illustratively includes an opening 48 through the core casing 20 to fluidly couple the bypass passage 24 to the cooling conduit 36. In some cases, a plurality of openings 48 is provided through the core casing 20, for instance arranged circumferentially relative to the axis 11 (see FIG. 1). In other cases, one or more openings 48 are axially spaced apart along the core casing 20. Other arrangements are contemplated. The cooling system is referred to as an active cooling system, as the activation of the valve 42 via controller 44, combined with the geometry of the protrusion 50, directly affects the volumetric flow rate of cooling air F3 flowing through the cooling conduit 36 towards the compressor casing 28. FIGS. 3A-3B show an arrangement where activation of the valve 42 (i.e., increasing the flow rate of high pressure air F4 injected into the bypass passage 24) increases the volumetric flow rate of cooling air F3 flowing towards the compressor casing 28, while FIGS. 4A-4B show an arrangement where activation of the valve 42 decreases the volumetric flow rate of cooling air F3 flowing towards the compressor casing 28.

Referring to FIGS. 3A-3B, in the shown case, activation of the valve 42 increases the volumetric flow rate of cooling air F3 flowing towards the compressor casing 28. When the valve 42 is in an “off” state or configuration (see FIG. 3A), little to no high pressure air F4 is injected into the bypass passage 24, resulting in little to no cooling air F3 flowing towards the compressor casing 28. For instance, this state corresponds to a steady state condition (e.g., cruising) of the engine 10 in which the cooling needs of the compressor casing 28 are reduced. As a result, little to no cooling air F3 flows to the compressor casing 28. In particular, the geometry of the protrusion 50, illustratively having an upstream end 50*a* and a downstream end 50*b* relative to a flow direction of the bypass air F2 through the bypass passage 24, deters the cooling air F3 from flowing through the cooling conduit 36 towards the compressor casing 28. In this case, the upstream end 50*a* of the protrusion has a radial height relative to the core casing 20 (i.e., extending into the bypass passage 24) that is greater than a corresponding radial height of the downstream end 50*b* of the protrusion 50. This difference in height is shown in FIGS. 3A-3B by the relative height D. A main inlet axis A is therefore oriented in a downstream direction relative to the flow of bypass air F2 in the bypass passage 24. The magnitude of relative height D can vary. As shown in FIG. 3A, by way of this geometry, the bypass air F2 is deterred from entering the inlet 38, and most or all of the cooling airflow F3 that enters the cooling conduit 36 via the inlet 38 subsequently flows out of the inlet 38 and rejoins the flow of bypass air F2.

Referring to FIG. 3B, the valve 42, positioned adjacent to the upstream end 50*a* of the protrusion 50, is shown in an "on" state or configuration. For instance, this state corresponds to an acceleration state of the engine 10 in which the cooling needs of the compressor casing 28 increase. In this state, the valve 42 injects a flow F4 of high pressure air from the high pressure air source 46 into the bypass passage 24 adjacent to the opening 48. In the shown case, the flow F4 is injected in a direction substantially parallel to the flow of bypass air F2 in the bypass passage 24. Other directions are contemplated. Illustratively, the flow F4 forms a pressurized air sheet adjacent to the opening 48 which energizes the boundary layer immediately downstream of the upstream end 50*a* of the protrusion 50. As a result, a portion of the bypass air F2 (i.e., the cooling flow F3) is directed through the opening 48 into the cooling conduit 36 towards the core casing 20.

Referring to FIGS. 3A-3B, it is thus understood that the valve 42, by way of controller 44, is configured for actively controlling the volumetric flow rate of cooling air F3 flowing to the compressor casing 28 by selectively injecting a flow of high pressure air F4 into the bypass passage 24 adjacent opening 48. While FIGS. 3A-3B show the valve to have binary "off" and "on" states, it is understood that in other embodiments the flow rate of the injected high pressure air F4 can be modulated between a minimum (e.g., no air) and a maximum flow rate, for instance based on the cooling needs of the compressor casing 28. In addition, in the embodiment shown in FIGS. 3A-3B, it is understood that there is a positive correlation between the flow rate of high pressure air F4 injected into bypass passage 24 and the flow rate of cooling air F3 flowing towards the compressor casing 28.

Referring to FIGS. 4A-4B, in contrast to the arrangement sown in FIGS. 3A-3B, activation of the valve 42, combined with the specific geometry of the protrusion 50, decreases the volumetric flow rate of cooling air F3 flowing towards the compressor casing 28. When the valve 42 is in an "on" state or configuration (see FIG. 4B), a flow of high pressure air F4 is injected into the bypass passage 24 adjacent to the opening 48, resulting in little to no cooling air F3 flowing towards the compressor casing 28. For instance, this state corresponds to steady state conditions (e.g., cruising) of the engine 10 in which the cooling needs of the compressor casing 28 are reduced. As a result, little to no cooling air F3 flows to the compressor casing 28. On the contrary, when the valve 42 is in the "off" state or configuration (see FIG. 4A), little to no high pressure air F4 is injected into the bypass passage 24, thereby promoting the flow of cooling air F3 towards the compressor casing 28. For instance, this state corresponds to an acceleration state of the engine 10 in which the cooling needs of the compressor casing 28 increase.

Still referring to FIGS. 4A-4B, the geometry of the protrusion 50, illustratively having an upstream end 50*a* and a downstream end 50*b* relative to a flow direction of the bypass air F2 through the bypass passage 24, promotes the flow of cooling air F3 through the cooling conduit 36 towards the compressor casing in the "off" state of the valve 42 (see FIG. 4A) and deters the cooling air F3 from flowing through the cooling conduit 36 towards the compressor casing 28 in the "on" state of the valve 42 (see FIG. 4B). In particular, in the shown case, the upstream end 50*a* of the protrusion has a radial height relative to the core casing 20 (i.e., extending into the bypass passage 24) that is inferior to a corresponding radial height of the downstream end 50*b* of the protrusion 50. This difference in height is shown in FIGS. 4A-4B by the relative height D. A main inlet axis A is therefore oriented in an upstream direction relative to the flow of bypass air F2 in the bypass passage 24. The magnitude of relative height D can vary. As shown in FIG. 4A, by way of this geometry, a portion of the bypass air F2 is directed into the inlet 38 when the valve 42 is in the "off state". For instance, this state corresponds to an acceleration state of the engine 10 in which the cooling needs of the compressor casing 28 increase.

Referring to FIG. 4B, the valve 42, positioned adjacent to the upstream end 50*a* of the protrusion 50, is shown in an "on" state or configuration. For instance, this state corresponds to a steady state condition of the engine 10 (e.g., cruising) in which the cooling needs of the compressor casing 28 are minimal. In this state, the valve 42 injects a flow F4 of high pressure air from the high pressure air source 46 into the bypass passage 24 adjacent opening 48, thereby disrupting or forcing detachment of the boundary layer of the flow of bypass air F2. In the shown case, the flow F4 is injected in a direction tangential to the flow of bypass air F2 in the bypass passage 24. Other directions are contemplated. Illustratively, the flow of high pressure air F4 disrupts the flow of bypass air F2 adjacent to the opening and deters cooling air F3 from entering the opening 48. In addition, most or all of the cooling airflow F3 that enters the cooling conduit 36 via the inlet 38 subsequently flows out of the inlet 38 and rejoins the flow of bypass air F2.

Referring to FIGS. 4A-4B, it is thus understood that the valve 42, by way of controller 44, is configured for actively controlling the volumetric flow rate of cooling air F3 flowing to the compressor casing 28 by selectively injecting a flow of high pressure air F4 into the bypass passage 24 adjacent opening 48. While FIGS. 3A-3B show the valve to have binary "off" and "on" states, it is understood that in other embodiments the flow rate of the injected high pressure air F4 can be modulated between a minimum (e.g., no air) and a maximum flow rate, for instance based on the cooling needs of the compressor casing 28. In addition, in the embodiment shown in FIGS. 4A-4B, it is understood that there is an inverse correlation between the flow rate of high pressure air F4 injected into bypass passage 24 and the flow rate of cooling air F3 flowing towards the compressor casing 28.

Figure 5:
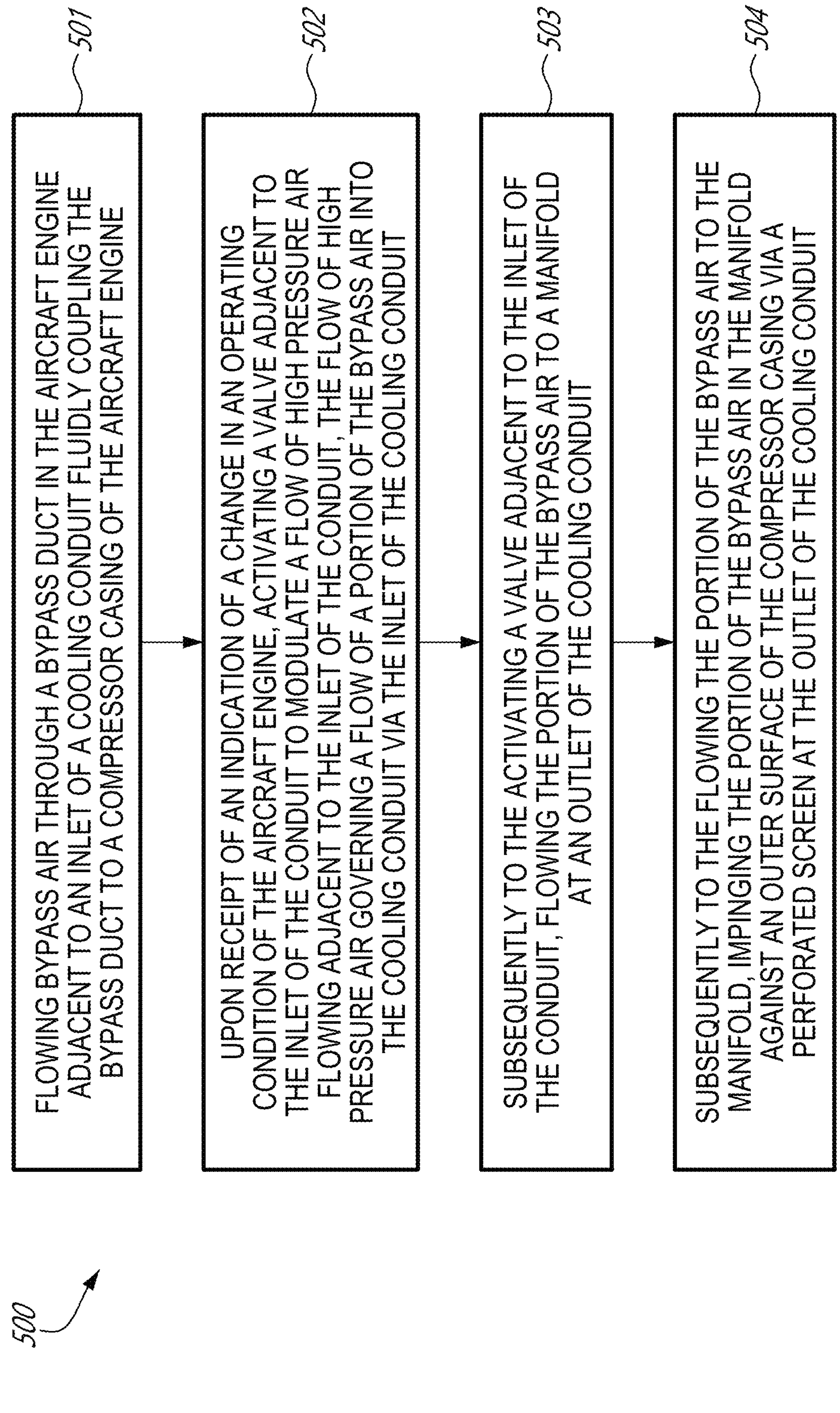
FIG. 5 is a flow chart of an exemplary method for operating a cooling system for a compressor casing in the engine of FIG. 1.

Referring now to FIG. 5, there is shown an exemplary method 500 for operating a cooling system in an aircraft engine 10. At step 501, bypass air F2 is flowed through a bypass passage 24 in the aircraft engine 10 adjacent to an inlet 38 of a cooling conduit 36 fluidly coupling the bypass passage 24 to a compressor casing 28 of the aircraft engine 10. At step 502, upon receipt of an indication of a change in an operating condition of the aircraft engine 10, a valve 42 adjacent to the inlet 38 of the conduit 36 is activated to modulate a flow of high pressure air F4 flowing adjacent to the inlet 38 of the conduit 36, the flow of high pressure air F4 governing a flow of a portion F3 of the bypass air F2 into the cooling conduit 36 via the inlet 38 of the cooling conduit 36. At step 503, subsequently to activating the valve 42, the portion F3 of the bypass air F2 is flowed to a manifold 52 at an outlet 40 of the cooling conduit 36. At step 504, subsequently to flowing F3 the portion of the bypass air F2 to the manifold 52, the portion F3 of the bypass air F2 in the manifold 52 is impinged against an outer surface of the compressor casing 28 via a perforated screen 54 at the outlet 40 of the cooling conduit 36. Various modifications and additions to the above method 400 are contemplated.

Figure 6:
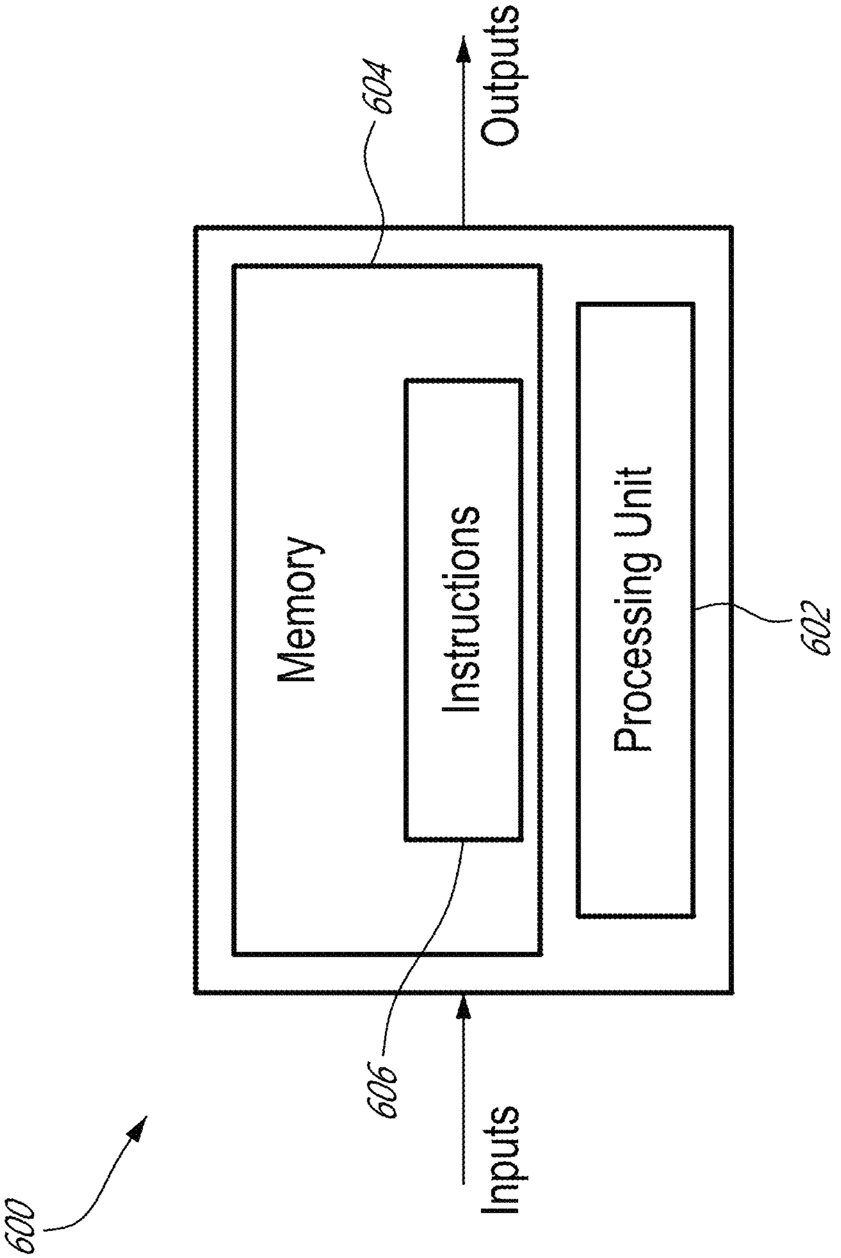
FIG. 6 is a block diagram of an example computing system for implementing the method of FIG. 5.

With reference to FIG. 6, in some embodiments, the method 500 may be implemented using a computing device 600 (for instance that includes controller(s) 44) comprising a processing unit 602 and a memory 604 which has stored therein computer-executable instructions 606. The processing unit 602 may comprise any suitable devices configured to implement the method 400 such that instructions 606, when executed by the computing device 600 or other programmable apparatus, may cause the functions/acts/steps of the method 400 as described herein to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, other suitable processing systems or circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to the device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602. In some embodiments, the computing device 600 can be implemented as part of a full-authority digital engine controls (FADEC) or other similar devices, including electronic engine control (EEC), engine control unit (ECU), and the like.

The methods and systems described herein may be implemented in a high level procedural or object oriented programming or scripting language, or a combination thereof, to communicate with or assist in the operation of a computer system, for example the computing device 600. Alternatively, the methods and systems may be implemented in assembly or machine language. The language may be a compiled or interpreted language. Program code for implementing the methods and systems for detection may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or in some embodiments the processing unit 602 of the computing device 600, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

According to the present disclosure, there is provided an aircraft engine system for varying the tip clearance between rotating turbine blades and the surrounding casing, based on the engine operating mode, by modulating a volumetric flow rate of a flow of cooling air being directed to the casing. Advantageously, the volumetric flow rate of the cooling air provided to the turbine is selected based on the desired level of shrinkage of the casing, which has a direct effect on the tip clearance. As such, fuel and air consumption are improved due to the minimization of tip clearance losses. In addition, in embodiments where the cooling air flow, after being used to cool the low and high pressure turbine casings or shrouds, is directed into the core gas flow path at the low pressure turbine, additional work or thrust is generated.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. For instance, in embodiments, the above-described cooling system is configured for flowing a flow of cooling bypass air to a compressor casing of an axial compressor to modulate a tip clearance between a shroud surrounding the axial compressor and tips of blades of the axial compressor. Yet further modifications could be implemented by a person of ordinary skill in the art in view of the present disclosure, which modifications would be within the scope of the present technology.

The invention claimed is:

1. A turbofan engine for an aircraft, comprising:

a compressor section including a compressor casing and a centrifugal compressor, an annular main gas path extending axially through a core casing of the turbofan engine within the compressor section, the centrifugal compressor including an impeller that rotates within a shroud surrounding blades of the impeller, the shroud being secured to the compressor casing, a tip clearance defined between blades of the impeller and the shroud;

a bypass duct disposed radially outward of the core casing and defining a bypass gas path extending therethrough;

a cooling conduit extending between an inlet in the bypass duct and an outlet adjacent to the compressor casing, a protrusion disposed about an opening to the inlet and protruding radially outwardly into the bypass duct, the cooling conduit including a manifold and a perforated screen adjacent the outlet; and a valve in selective fluid communication with the inlet of the cooling conduit, the valve fluidly coupled to a source of high pressure air and being controlled to move between a closed position and an open position, wherein in the open position during operation of the turbofan engine a flow of the high pressure air is injected adjacent the inlet of the cooling conduit in a direction tangential to the bypass gas path, and in the closed position during operation of the turbofan engine the high pressure air is substantially prevented from being injected into the cooling conduit or the bypass duct.

2. The turbofan engine as defined in claim 1, wherein the protrusion includes a first radial height relative to the core casing at an upstream end of the opening to the inlet and a second radial height relative to the core casing at a downstream end of the opening to the inlet, the first radial height and the second radial height being different.

3. The turbofan engine as defined in claim 2, wherein the first radial height is greater than the second radial height, and the valve is positioned in the open position to inject the high pressure air under an acceleration condition of the turbofan engine, thereby increasing a flow rate of cooling air through the cooling conduit.

4. The turbofan engine as defined in claim 2, wherein the second radial height is greater than the first radial height.

5. The turbofan engine as defined in claim 4, wherein the valve is positioned in the closed position under an acceleration condition of the turbofan engine, thereby increasing a flow rate of cooling air through the cooling conduit.

6. The turbofan engine as defined in claim 1, wherein the perforated screen at the outlet of the cooling conduit extends circumferentially about an entire circumference of the compressor casing.

7. The turbofan engine as defined in claim 1, further comprising a plurality of the cooling conduit with a plurality of the perforated screen circumferentially spaced apart about a circumference of the compressor casing.

8. The turbofan engine as defined in claim 1, wherein the perforated screen includes a double-walled metal sheet having perforations disposed therethrough.

9. A cooling system for a compressor casing of a turbofan engine comprising a compressor, the cooling system comprising:

a cooling conduit extending between an inlet in fluid communication with a bypass duct of the turbofan engine and an outlet in fluid communication with an outer surface of the compressor casing, a shroud of the compressor being mounted to the compressor casing, a protrusion disposed about an opening to the inlet and protruding radially outwardly into the bypass duct; and a valve in selective fluid communication with the inlet of the cooling conduit, the valve selectively injecting a flow of high pressure air from a high pressure air source towards the inlet of the cooling conduit to modulate a flow of bypass air entering the cooling conduit.

10. The cooling system as defined in claim 9, wherein the protrusion includes a first radial height into the bypass duct at an upstream end of the opening to the inlet and a second radial height into the bypass duct at a downstream end of the opening to the inlet, the first radial height being greater than the second radial height.

11. The cooling system as defined in claim 10, wherein the valve is adapted to increase a flow rate of the flow of high pressure air injected into the bypass duct under an acceleration condition of the turbofan engine.

12. The cooling system as defined in claim 9, wherein the protrusion includes a first radial height into the bypass duct at an upstream end of the opening to the inlet and a second radial height into the bypass duct at a downstream end of the opening to the inlet, the second radial height being greater than the first radial height.

13. The cooling system as defined in claim 12, wherein the valve is adapted to decrease a flow rate of the flow of high pressure air injected into the bypass duct under an acceleration condition of the turbofan engine.

14. The cooling system as defined in claim 9, further comprising a perforated screen at the outlet of the cooling conduit, wherein the perforated screen extends circumferentially about an entire circumference of the compressor casing.

15. The cooling system as defined in claim 9, further the cooling conduit is one of a plurality of cooling conduits, the plurality of cooling conduits including perforated screens at the outlet thereof, the perforated screens being circumferentially spaced apart about a circumference of the compressor casing.

16. The cooling system as defined in claim 14, wherein the perforated screen includes a double-walled metal sheet having perforations disposed therethrough.

17. A method for operating a cooling system for a compressor casing in a turbofan aircraft engine, comprising:

flowing bypass air through a bypass duct in the turbofan aircraft engine adjacent to an inlet of a cooling conduit fluidly coupling the bypass duct to a compressor casing of the turbofan aircraft engine;

upon receipt of an indication of a change in an operating condition of the turbofan aircraft engine, activating a valve adjacent to the inlet of the cooling conduit to modulate a flow of high pressure air flowing adjacent to the inlet of the cooling conduit, the flow of high pressure air governing a flow of a portion of the bypass air into the cooling conduit via the inlet of the cooling conduit;

subsequent to the activating the valve adjacent to the inlet of the cooling conduit, flowing the portion of the bypass air to a manifold at an outlet of the cooling conduit; and impinging the portion of the bypass air in the manifold against an outer surface of the compressor casing.

18. The method as defined in claim 17, wherein the change in the operating condition of the turbofan aircraft engine includes the turbofan aircraft engine being in an acceleration condition, and wherein the activating the valve adjacent to the inlet of the cooling conduit includes increasing a flow rate of the high pressure air flowing adjacent the inlet to the cooling conduit.

19. The method as defined in claim 17, wherein the change in the operating condition of the turbofan aircraft engine includes the turbofan aircraft engine being in an acceleration condition, and wherein the activating the valve adjacent the inlet to the cooling conduit includes decreasing a flow rate of the high pressure air flowing adjacent the inlet to the cooling conduit.

20. The method as defined in claim 17, wherein the impinging the portion of the bypass air in the cooling conduit against the outer surface of the compressor casing includes impinging the portion of the flow of the bypass air in the cooling conduit against the outer surface of the compressor casing about an entire outer circumference of the compressor casing.

* * * * *